(12) United States Patent
Ishizaki

(10) Patent No.: US 10,634,963 B2
(45) Date of Patent: Apr. 28, 2020

(54) THIN-FILM TRANSISTOR ARRAY AND METHOD FOR MANUFACTURING THE SAME

(71) Applicant: TOPPAN PRINTING CO., LTD., Taito-ku (JP)

(72) Inventor: Mamoru Ishizaki, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 0 days.

(21) Appl. No.: 15/921,797

(22) Filed: Mar. 15, 2018

(65) Prior Publication Data

US 2018/0203270 A1 Jul. 19, 2018

Related U.S. Application Data

(63) Continuation of application No. PCT/JP2016/004103, filed on Sep. 8, 2016.

(30) Foreign Application Priority Data

Sep. 15, 2015 (JP) ................................. 2015-181838

(51) Int. Cl.
  *G02F 1/1345* (2006.01)
  *G09F 9/30* (2006.01)
  (Continued)

(52) U.S. Cl.
  CPC .......... *G02F 1/1345* (2013.01); *G02F 1/1368* (2013.01); *G02F 1/136286* (2013.01);
  (Continued)

(58) Field of Classification Search
  CPC ............ G02F 1/136286; G09G 3/3648; G09G 3/3614
  See application file for complete search history.

(56) References Cited

U.S. PATENT DOCUMENTS

| 6,232,947 B1 | 5/2001 | Miyawaki et al. |
| 2001/0040549 A1 | 11/2001 | Miyawaki et al. |

(Continued)

FOREIGN PATENT DOCUMENTS

| JP | 4-360127 A | 12/1992 |
| JP | 7-253571 A | 10/1995 |

(Continued)

OTHER PUBLICATIONS

Extended European Search Report dated Jul. 5, 2018 in Patent Application No. 16845926.1, 10 pages.

(Continued)

*Primary Examiner* — Raj R Gupta
(74) *Attorney, Agent, or Firm* — Oblon, McClelland, Maier & Neustadt, L.L.P.

(57) ABSTRACT

A thin-film transistor array including an insulating substrate, gate lines formed on the insulating substrate, source lines formed on the insulating substrate, and transistors each being formed on the insulating substrate at a position corresponding to a respective intersection of the gate lines and the source lines, and formed in a matrix including pixels in rows and columns, each of the transistors including a gate electrode connected to each of the gate lines, a source electrode connected to each of the source lines, a drain electrode, and a pixel electrode connected to the drain electrode. Each of the source lines is connected to a column of pixels, and each of the gate lines includes a first portion connected to a predetermined number of pixels in a row and a second portion connected to pixels in an adjacent row.

13 Claims, 8 Drawing Sheets

(51) Int. Cl.
*G02F 1/1362* (2006.01)
*G09F 9/00* (2006.01)
*G09G 3/36* (2006.01)
*G02F 1/1368* (2006.01)

(52) U.S. Cl.
CPC ............ *G09F 9/00* (2013.01); *G09F 9/30* (2013.01); *G09G 3/36* (2013.01); *G02F 1/136213* (2013.01); *G02F 2001/136295* (2013.01); *G09G 2300/0408* (2013.01); *G09G 2300/0426* (2013.01)

(56) References Cited

U.S. PATENT DOCUMENTS

2008/0186271 A1* 8/2008 Yokoyama ........ G02F 1/136213
345/100
2011/0017994 A1 1/2011 Kuo et al.

FOREIGN PATENT DOCUMENTS

JP 9-90423 A 4/1997
JP 2015-138197 A 7/2015

OTHER PUBLICATIONS

English language translation only of International Search Report dated Nov. 22, 2016 in PCT/JP2016/004103, 2 pages.

\* cited by examiner

THIN-FILM TRANSISTOR ARRAY AND METHOD FOR MANUFACTURING THE SAME

CROSS-REFERENCE TO RELATED APPLICATIONS

The present application is a continuation of International Application No. PCT/JP2016/004103, filed Sep. 8, 2016, which is based upon and claims the benefits of priority to Japanese Application No. 2015-181838, filed Sep. 15, 2015. The entire contents of these applications are incorporated herein by reference.

BACKGROUND OF THE INVENTION

Field of the Invention

The present invention relates to a thin-film transistor array and a method for manufacturing the same.

Discussion of the Background

Thin-film transistors (TFT) have been manufactured that have a layer of amorphous silicon (a-Si) or polycrystalline silicon (poly-Si) formed on a glass substrate, based on technologies of semiconductor-based transistors or integrated circuits. One example of applications for such TFTs are liquid-crystal displays (LCDs). TFTs act as switches; when turned on by a selection voltage applied to its gate line, they write onto a pixel electrode connected to a drain electrode a signal voltage applied to a source line. The written voltage is retained by a storage capacitor formed of the pixel electrode/a gate insulating layer/a capacitor electrode. With TFT arrays, the source and drain are interchangeable depending on the polarity of a writing voltage, so the names "source" and "drain" cannot be assigned to electrodes based on their operation. For convenience, one electrode is termed a source and the other electrode is termed a drain. In the present invention, the source refers to an electrode connected to a line, and the drain refers to an electrode connected to a pixel electrode. Note that the capacitor electrode is not necessary, and the capacitance of a display medium (an LCD here) can be used as the storage capacitor.

Organic semiconductors and oxide semiconductors have been developed in recent years. It has been demonstrated that they enable the fabrication of TFTs at low temperatures less than or equal to 200° C., leading to high expectations for their application to flexible displays using plastic substrates. Besides the flexibility, such displays are expected to be lighter, thinner, and robust. These displays are also expected to have a large screen at low cost if the TFTs are formed by printing.

For a display having a large difference in the number of pixels between the rows and columns, large numbers of either source drivers or gate drivers are needed, while only a few outputs of the other are used, which increases the cost of these displays. Typically, source lines are the longitudinal lines or horizontal lines that are greater in number. This requires a large number of source drivers, while only a few outputs of a gate driver are used. With 1200×100 pixels, for example, in the case of using a source driver having 400 outputs and a gate driver having 300 outputs, three source drivers and one gate driver are needed.

To solve the problem, PTL 1 discloses a method of connecting a common source signal to two source lines, and connecting a different gate line to each of transistors connected to the common signal. This method reduces the number of source signals by half while doubling the number of gate signals. However, the method of PTL 1 reduces a gate line pitch by half a pixel pitch, requiring two gate lines to run through one pixel.

A method for elimination of the need involves connecting gate lines from opposite sides of a display area (see FIG. 8). FIG. 8 illustrates gate lines and source lines, with transistors and pixel electrodes at their intersections omitted. Half of the gate lines are routed to the left side of the pixel area for its left half, and the other half to the right side for its right half. This eliminates the need for two gate lines to run through one pixel, resulting in one gate line required for each pixel.

This method, however, only reduces the number of source signals to half. With 1200×100 pixels, for example, in the case of using a source driver having 400 outputs and a gate driver having 300 outputs, two source drivers and one gate driver are needed.

Thus, it has been difficult to use source drivers and gate drivers efficiently when there is a large difference in the number of pixels between the rows and columns.

PTL 1 JP 1992-360127 A

SUMMARY OF THE INVENTION

According to an aspect of the present invention, a thin-film transistor array includes an insulating substrate, gate lines formed on the insulating substrate, source lines formed on the insulating substrate, and transistors each being formed on the insulating substrate at a position corresponding to a respective intersection of the gate lines and the source lines, and formed in a matrix including pixels in rows and columns, each of the transistors including a gate electrode connected to each of the gate lines, a source electrode connected to each of the source lines, a drain electrode, and a pixel electrode connected to the drain electrode. Each of the source lines is connected to a column of pixels, and each of the gate lines includes a first portion connected to a predetermined number of pixels in a row and a second portion connected to pixels in an adjacent row.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
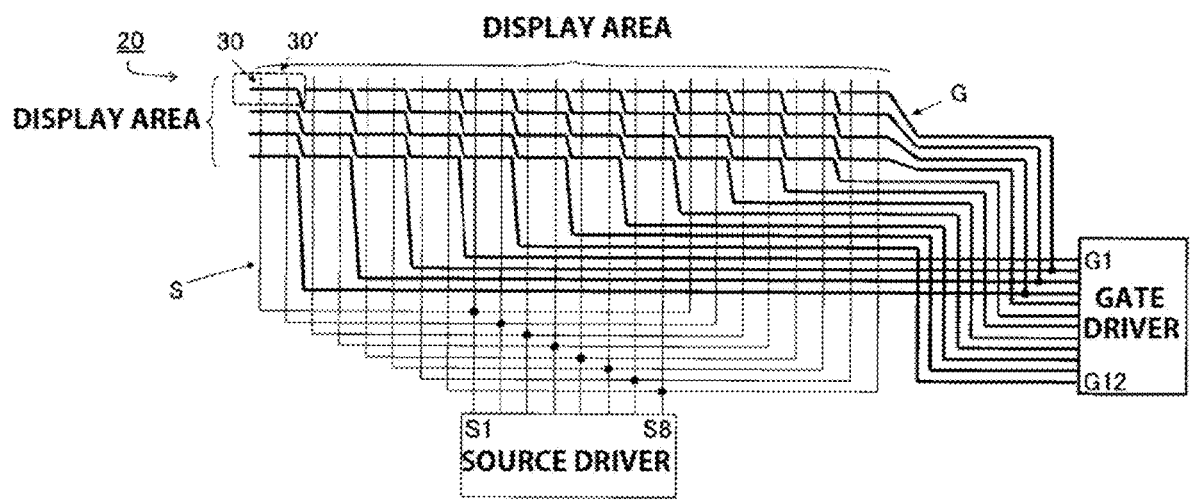
FIG. 1 is a plan view of a thin-film transistor array, according to an embodiment of the present invention.

The embodiments will now be described with reference to the accompanying drawings, wherein like reference numerals designate corresponding or identical elements throughout the various drawings.

An embodiment of the present invention will now be described with reference to the accompanying drawings. The drawings are not to scale for ease of description. As used here, the terms "row" and "column" respectively refer to a set of pixels 30 lined up in the lateral direction and a set of pixels 30 lined up in the longitudinal direction in the drawings.

FIG. 1 is a plan view of a thin-film transistor array 20 according to an embodiment of the present invention. FIGS. 3A to 3F illustrate a process for manufacturing the thin-film transistor array 20. FIGS. 4A to 4F are enlarged plan views of four pixels, illustrating the process for manufacturing the thin-film transistor array 20. As illustrated in FIGS. 1, 3A to 3F, and 4A to 4F, the thin-film transistor array 20 includes an insulating substrate 1 and a plurality of pixels 30 each having a gate electrode 2, a source electrode 4, a drain electrode 5, and a pixel electrode 7 connected to the drain electrode 5, and is connected to a plurality of gate lines G and a plurality of source lines S, with the pixels 30 arranged in a matrix on the substrate 1. Each of the source lines is connected to a column of pixels 30. Each of the gate lines has at least a portion connected to a pixel group 30' formed of a predetermined number of pixels 30 disposed in a row and to another pixel group 30' disposed in an adjacent row. The source lines S are connected to a source driver, and the gate lines G to a gate driver. When the pixels are arranged in a rectangular pattern with N rows×M columns, a same source signal is connected to i source lines S, while pixels 30 connected to the same source signal S are each connected to a different one of the gate lines G. Thus, the number of source signals is M/i, and the number of gate signals is N×i, where i is an integer greater than or equal to 2. In FIG. 1, M is 24, N is 4, and i is 3. M and N are small values here for ease of illustration. FIG. 1 only illustrates gate lines G and source lines S, with other components disposed at their intersections, including a pixel electrode 7, omitted.

In FIGS. 1, 3A to 3F, and 4A to 4F, the gate lines G are downward to the right, but they may be upward to the right instead. Additionally, whereas the gate lines G are powered from the right side, they may be powered from the left side.

Figure 6:
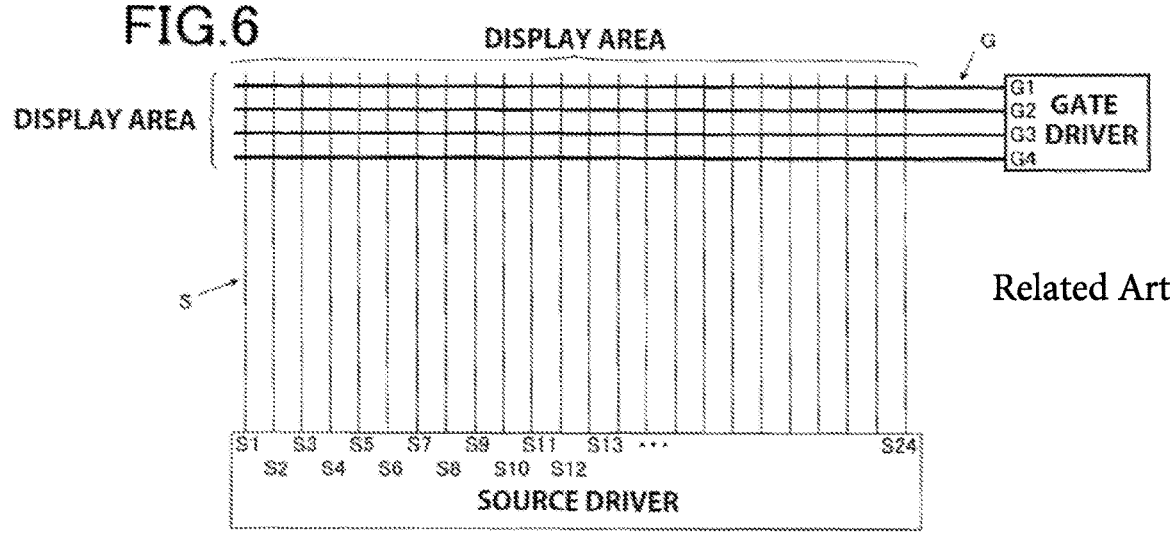
FIG. 6 is a plan view of a conventional thin-film transistor array.
Figure 7:
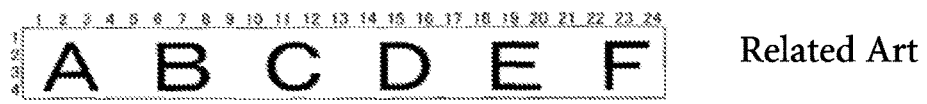
FIG. 7 illustrates example image data for driving the conventional thin-film transistor array.

The conventional techniques will now be described. FIG. 6 is a plan view of a conventional thin-film transistor array, while FIG. 7 illustrates example image data for driving the transistor array. For 24×4 pixels, conventional basic configurations require 24 source outputs and 4 gate outputs as illustrated in FIG. 6. The image data is 24×4 pixels as illustrated in FIG. 7.

Figure 8:
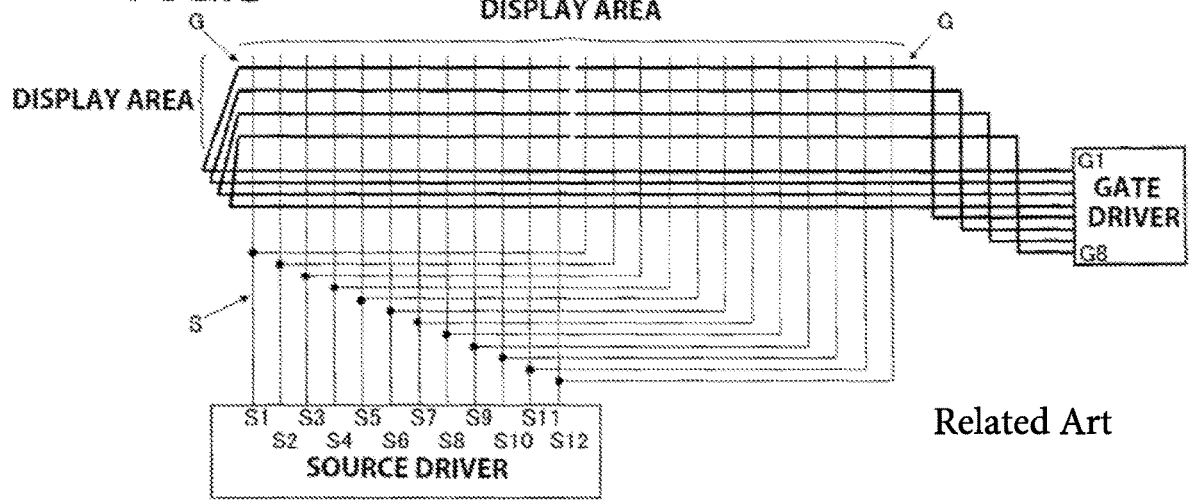
FIG. 8 is a plan view of a conventional thin-film transistor array.
Figure 9:
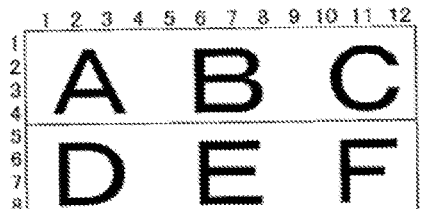
FIG. 9 illustrates example image data for driving the conventional thin-film transistor array.

FIG. 8 is a plan view of another conventional thin-film transistor array, while FIG. 9 illustrates example image data for driving the transistor array. For 24×4 pixels, with conventional configurations that reduce the number of source lines to half, 12 source outputs and 8 gate outputs are used as illustrated in FIG. 8. The image data is 12×8 pixels as illustrated in FIG. 9.

Figure 10:
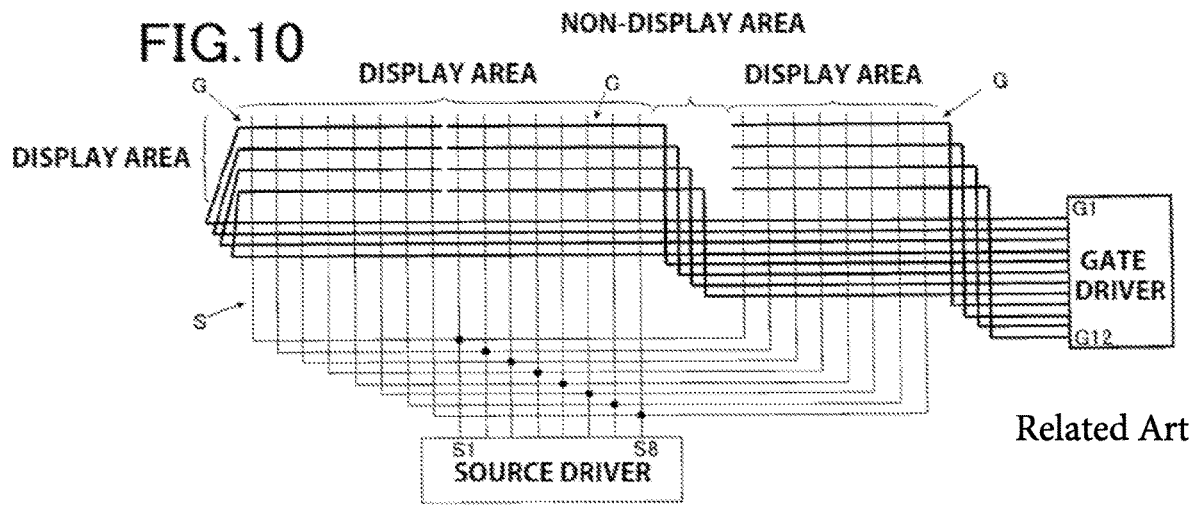
FIG. 10 is a plan view of a thin-film transistor array presenting a problem with a conventional technique.
Figure 11:
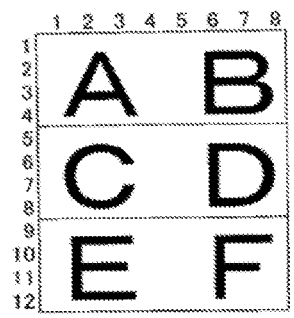
FIG. 11 illustrates example image data for driving the thin-film transistor array.

FIG. 10 is a plan view of a thin-film transistor array presenting a problem with a conventional technique, while FIG. 11 illustrates example image data for driving the transistor array. For 24×4 pixels, it may seem that reducing the number of source lines to one third with a mere extension of conventional methods results in 8 source outputs and 12 gate outputs as illustrated in FIG. 10. This approach, however, requires the transistor array to have a region into which a group of gate lines at a central portion are routed. Consequently, as illustrated in FIG. 10, a non-display area is formed at a location two thirds from the left side, making the transistor array useless. The image data is 8×12 pixels as illustrated in FIG. 11.

Unlike the conventional technique and its extension, the thin-film transistor array 20 of FIG. 1 has source lines S each connected to a column of pixels 30, with gate lines G connected thereto so that they are mostly parallel to rows but offset by one row every predetermined number of pixels. This configuration allows one gate line G to extend out from one pixel to the outside of a display area. As illustrated in FIGS. 3A to 3F and 4A to 4F, gate lines G and capacitor lines C are each offset by one row. With this arrangement, one gate line G and one capacitor line C, which are provided for one pixel, extend in the longitudinal direction between adjacent pixels, allowing them to be disposed between a capacitor electrode C and a gate electrode G. Thus, no non-display areas are formed such as that of FIG. 10, reducing the number of source lines to 1/i while the pixels 30 are of equal pitch, where i is an integer greater than or equal to 2. When i=2, no non-display areas are formed even with the process of FIG. 8; with the thin-film transistor array 20, the configuration provides another advantage. The process of FIG. 8 requires a group of gate lines to be disposed at the left and right sides of the display area, increasing the size of a border (a non-display area surrounding the display area) at the left- and right-side portions of the display area. In contrast, the thin-film transistor array 20 requires no power supply for gates from one of the left and right sides (left side in FIG. 1), allowing a portion of a border at that side to be smaller.

When the predetermined number of pixels forming a pixel group 30' is k, k is preferably M/(i×N) or less. In this case, the number of source lines S overlapping a gate line G is M/i or less, which allows the use of a source driver that provides M/i outputs. When M=24, N=4, and i=3, for example, k is 2 or less. In this case, gate lines G are offset by one row for every two pixels, enabling driving with 8 source outputs and 12 gate outputs. When M=1200, N=100, and i=3, for example, M/i is 400 and N×3 is 300. In this case, one source driver and one gate driver are sufficient if they have 400 outputs and 300 outputs, respectively. Additionally, k is 4 or less in this case, so gate lines are offset by one row every four columns.

It is noted that k may not be an integer. For example, when M=1600, N=75, and i=4, M/i is 400, N×3 is 300, and k=16/3=5.33 . . . . In this case, gate lines G, for example, are repeatedly shifted by one row at fifth column, one row at fifth column, and one row at sixth column, in this order, resulting in the gate lines G being offset by one row for every 16/3 columns on average. This configuration is possible. That is, although the description contains the phrase "a predetermined number of pixels, k," for simplification, the number of pixels does not need to be fixed as long as an average of that number of pixels is k or less.

The integer k is preferably 1 or more. If k is less than 1, a gate line G has a portion offset by two rows. In that case, two gate lines G and two capacitor lines C, which are provided for two pixels (two lines), extend in the longitudinal direction between adjacent pixels. This makes it difficult to dispose the gate lines G and capacitor lines C between a capacitor electrode 10 and a gate electrode 2.

Figure 2:
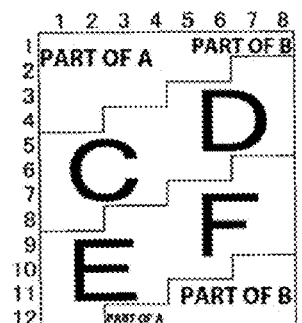
FIG. 2 illustrates example image data for driving the thin-film transistor array.

In the thin-film transistor array 20 of FIG. 1, the arrangement of gate lines G is a little complex, which requires adjustment of image data for driving. Specifically, the image data needs to be altered by the amount of offset made by the gate lines G. For the thin-film transistor array 20 of FIG. 1, the image of FIG. 2 can be used. The image of FIG. 7 can be easily processed into the image of FIG. 2.

FIGS. 3A to 3F and 4A to 4F will now be described. These figures illustrate a more specific example of the thin-film transistor array 20 of FIG. 1.

Figure 3A:
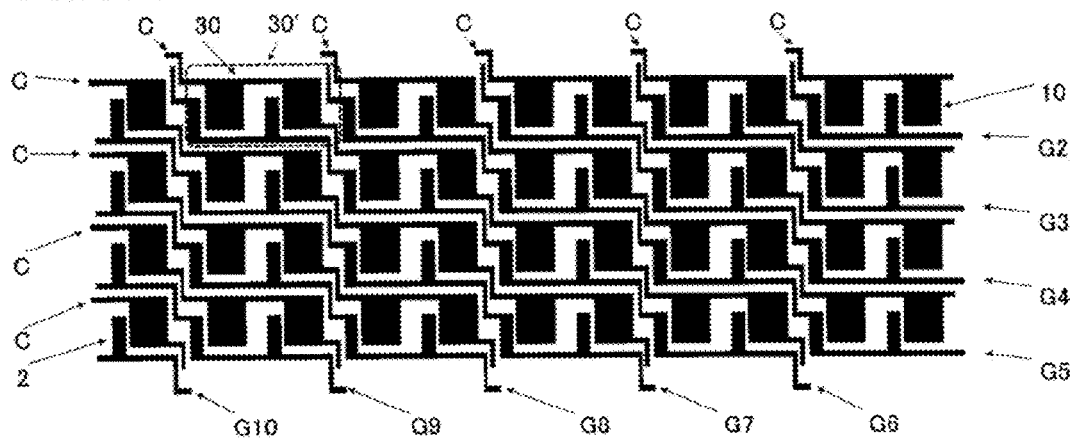
FIG. 3A is a plan view of the thin-film transistor, illustrating a method for manufacturing the same, according to the embodiment of the present invention.

FIGS. 3A to 3F illustrate a manufacturing process for the 11 columns disposed from the right side of the display area of FIG. 1. FIGS. 4A to 4F are enlarged plan views of four pixels, illustrating the manufacturing process. Although the thin-film transistor array 20 has a capacitor electrode 10 disposed in the same layer as a gate electrode 2, the capacitor electrode 10 may be eliminated, or the capacitor electrode 10 may be disposed in a layer not including a gate electrode 2. FIG. 3A illustrates gate lines G2 to G10 (collectively, "gate line G"), gate electrodes 2 connected to the gate lines G, capacitor lines C, and capacitor electrodes 10 connected to the capacitor lines C, with these components formed on an insulating substrate 1. FIG. 4A illustrates gate lines G, gate electrodes 2 connected to the gate lines G, capacitor lines C, and capacitor electrodes 10 connected to the capacitor lines C, with these components formed on an insulating substrate 1.

Figure 3B:
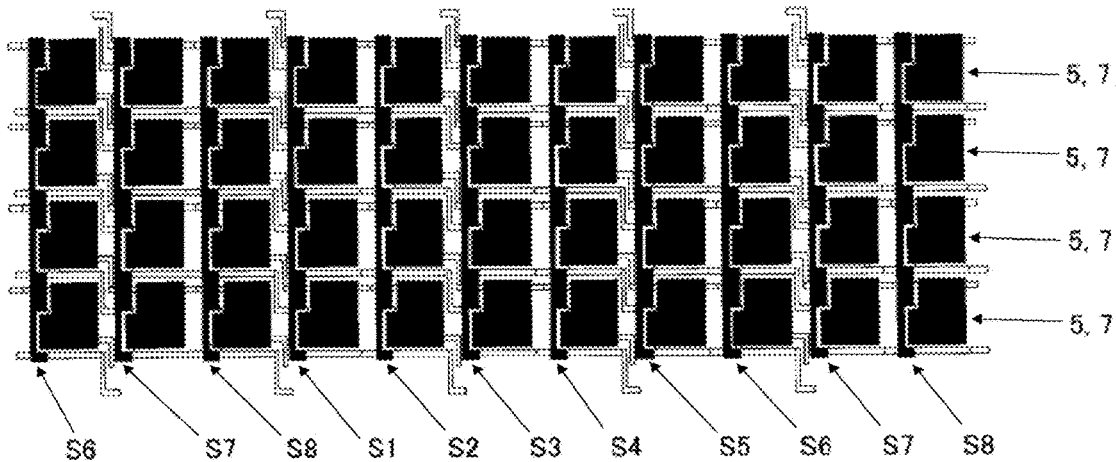
FIG. 3B is a plan view of the thin-film transistor, illustrating the method for manufacturing the same, according to the embodiment of the present invention.
Figure 4A:
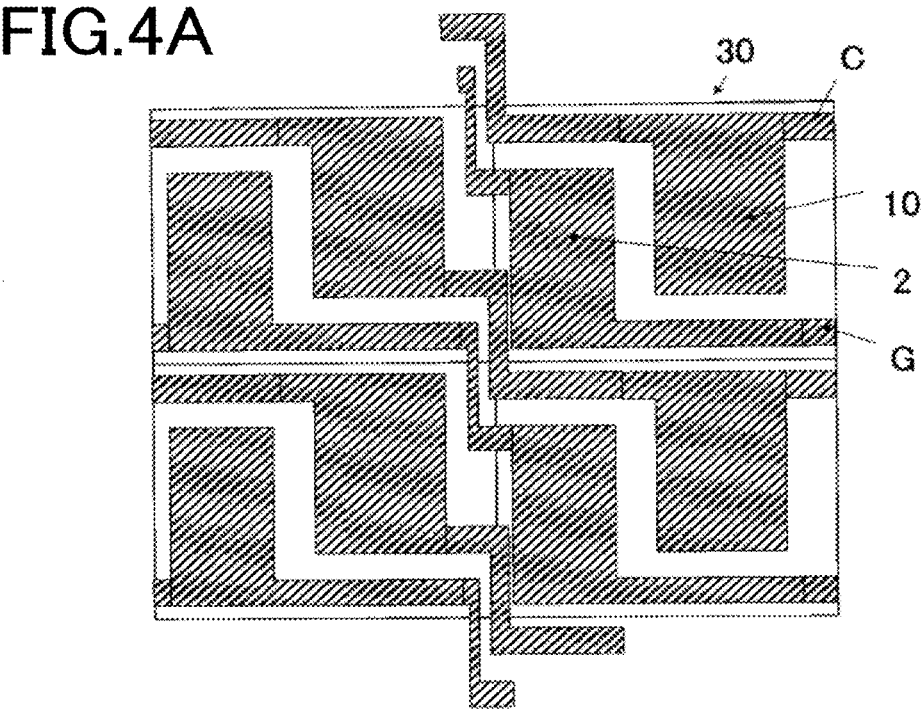
FIG. 4A is a plan view of the thin-film transistor, illustrating the method for manufacturing the same, according to the embodiment of the present invention.
Figure 4B:
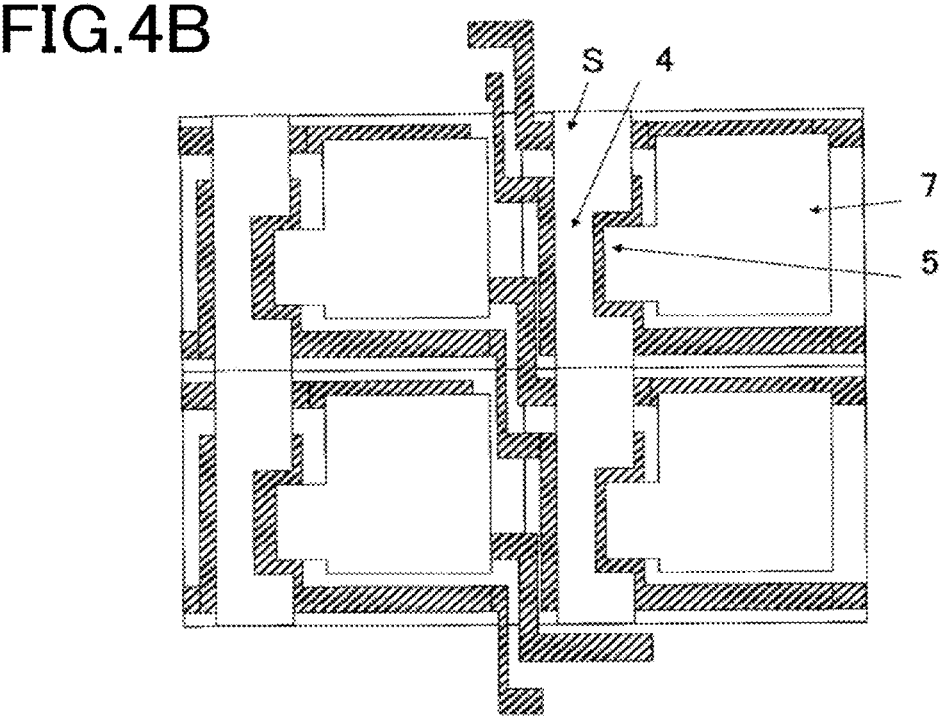
FIG. 4B is a plan view of the thin-film transistor, illustrating the method for manufacturing the same, according to the embodiment of the present invention.

FIG. 3B illustrates a gate insulating layer 3 formed over the components in the state of FIG. 3A and formed with source lines S1 to S8 (collectively, "source line S"), source electrodes 4 connected to the source lines S (which serve as each source electrode 4 as well in this example transistor), drain electrodes 5, and pixel electrodes 7. FIG. 4B illustrates a gate insulating layer 3 formed over the entire surface of the insulating substrate 1, gate lines G, gate electrodes 2, capacitor lines C, and capacitor electrodes 10 illustrated in FIG. 4A, and formed with source lines S, source electrodes 4 connected to the source lines S (which serve as each source electrode 4 as well in this example transistor), drain electrodes 5, and pixel electrodes 7.

Figure 3C:
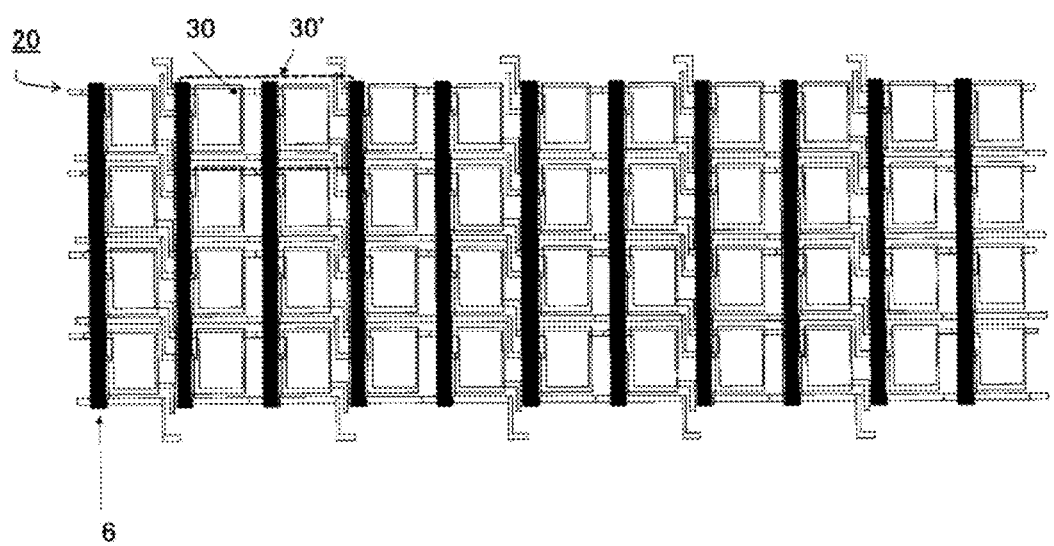
FIG. 3C is a plan view of the thin-film transistor, illustrating the method for manufacturing the same, according to the embodiment of the present invention.
Figure 4C:
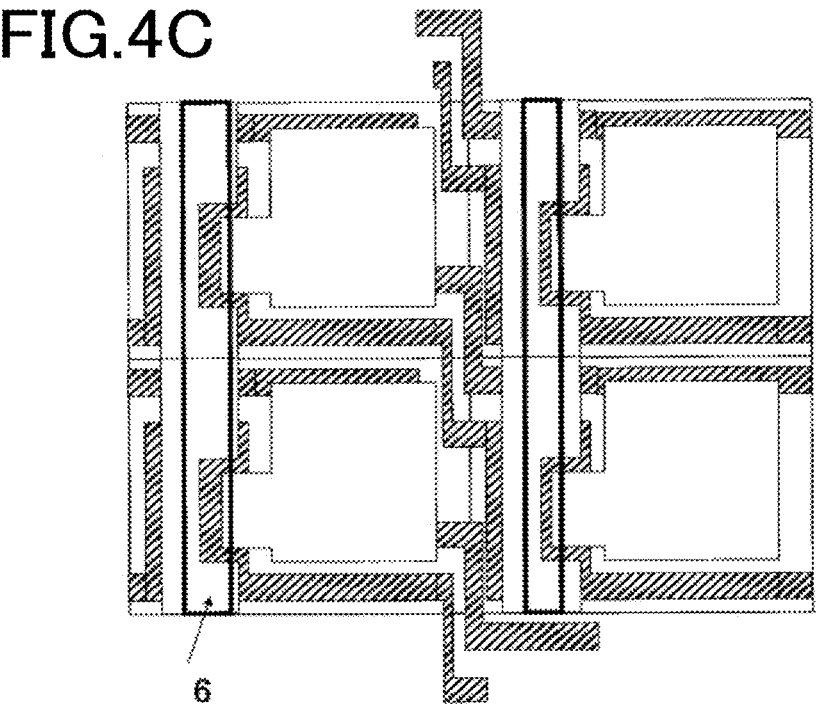
FIG. 4C is a plan view of the thin-film transistor, illustrating the method for manufacturing the same, according to the embodiment of the present invention.

FIGS. 3C and 4C illustrate semiconductor patterns 6 formed between source electrodes 4 and drain electrodes 5. The semiconductor patterns 6 formed on a column of pixels 30 are each parallel to a source line S so as to have a stripe pattern. This stripe pattern is employed to facilitate the formation of the semiconductor pattern 6. Alternatively, the semiconductor pattern 6 may be provided for each pixel.

Figure 3D:
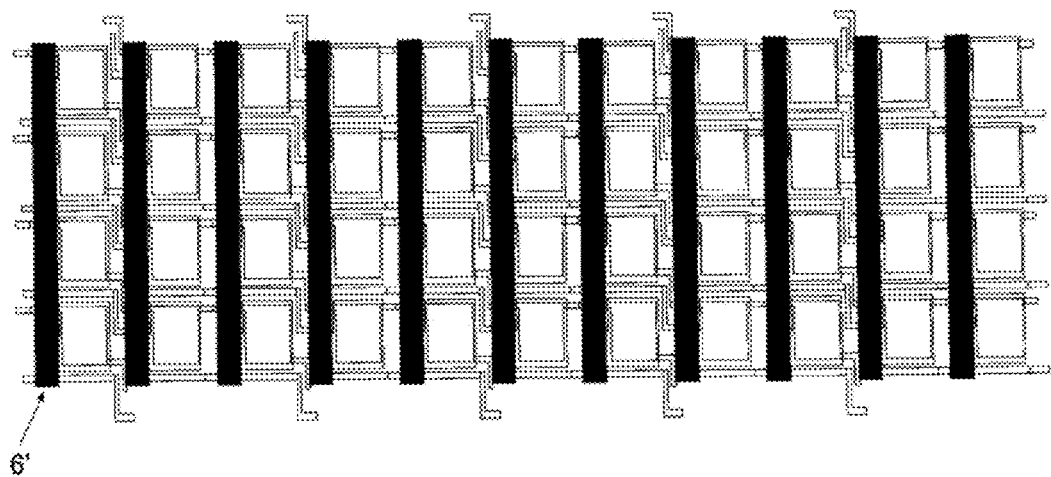
FIG. 3D is a plan view of the thin-film transistor, illustrating the method for manufacturing the same, according to the embodiment of the present invention.
Figure 4D:
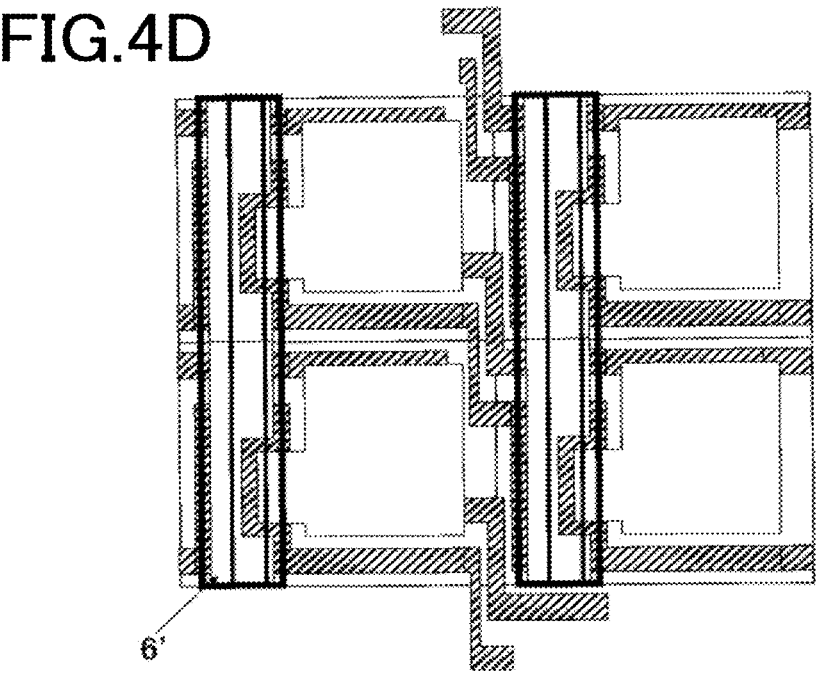
FIG. 4D is a plan view of the thin-film transistor, illustrating the method for manufacturing the same, according to the embodiment of the present invention.

FIGS. 3D and 4D illustrate a protective layer 6' formed over the semiconductor pattern 6. The protective layer 6' is provided to prevent an insulating layer 8 described later from adversely affecting the semiconductor pattern 6. The protective layer 6' can be eliminated if the insulating layer 8 will not have an adverse effect on the semiconductor pattern 6.

Figure 3E:
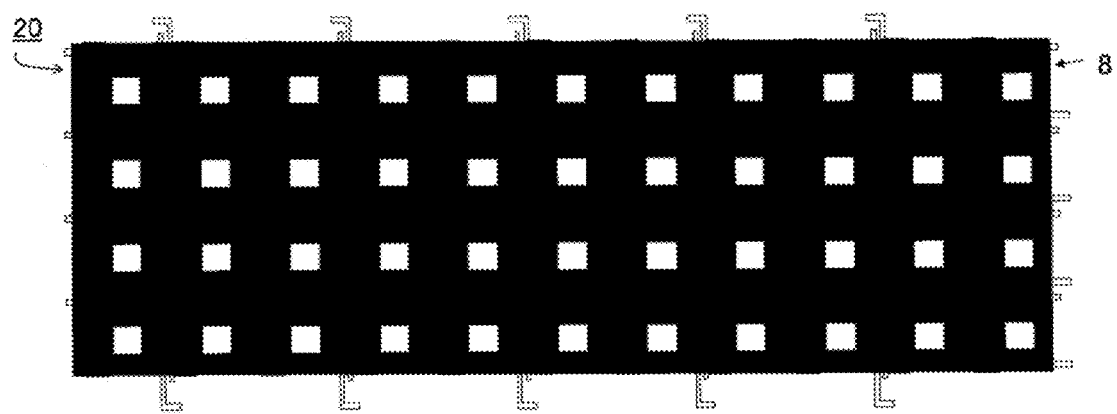
FIG. 3E is a plan view of the thin-film transistor, illustrating the method for manufacturing the same, according to the embodiment of the present invention.
Figure 4E:
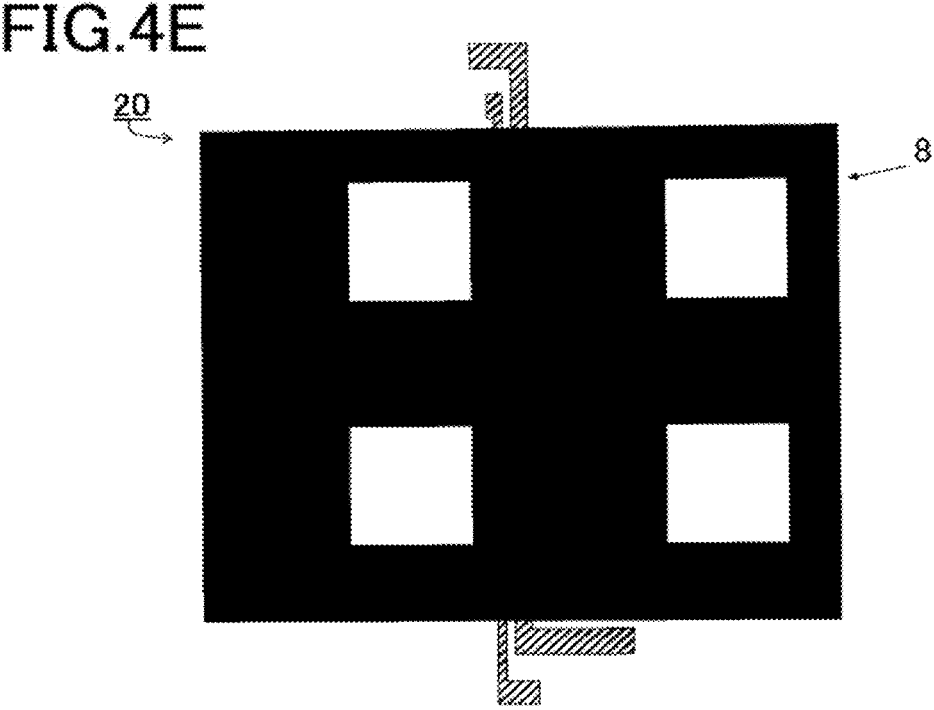
FIG. 4E is a plan view of the thin-film transistor, illustrating the method for manufacturing the same, according to the embodiment of the present invention.

FIGS. 3E and 4E illustrate an insulating layer 8 formed over the protective layers 6', source electrodes 4, and drain electrodes 5. The insulating layer 8 covers at least the semiconductor patterns 6, source electrodes 4, source lines S, and pixel electrodes 7, with an opening formed on each pixel electrode 7. The insulating layer 8 is provided to prevent the source lines S and source electrodes 4 from affecting the display, and thus needs to cover at least the source lines S and source electrodes 4.

Figure 3F:
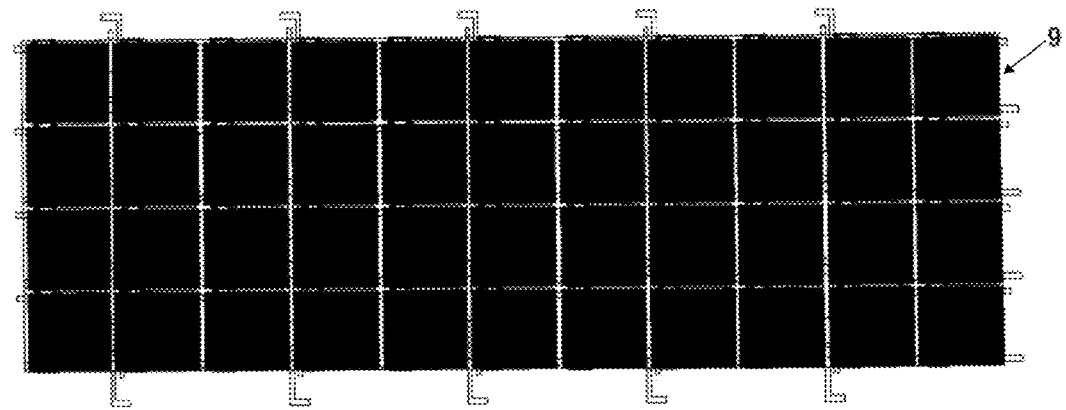
FIG. 3F is a plan view of the thin-film transistor, illustrating the method for manufacturing the same, according to the embodiment of the present invention.
Figure 4F:
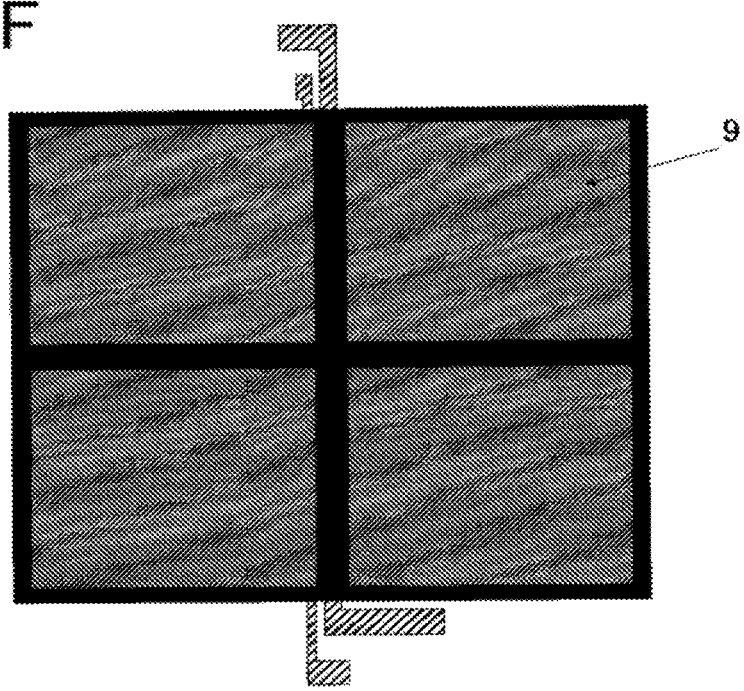
FIG. 4F is a plan view of the thin-film transistor, illustrating the method for manufacturing the same, according to the embodiment of the present invention.

FIGS. 3F and 4F illustrate an upper pixel electrode 9 formed on the insulating layer 8. The upper pixel electrode 9 is connected to a pixel electrode 7 through an opening of the insulating layer 8. The upper pixel electrode 9 serves as a pixel electrode 21 for changing the color of a display medium in an image display apparatus described later. Note that the upper pixel electrode 9 may be omitted. In that case, a pixel electrode 7 in an opening of the insulating layer serves as a pixel electrode 21 for changing the color of a display medium 13.

Examples of the material for the insulating substrate 1 may include inorganic materials such as glass, and organic materials such as polyethylene terephthalate (PET), polyethylene naphthalate (PEN), polyether sulfone (PES), polycarbonate, polyimide (PI), polyether imide (PEI), polystyrene (PS), polyvinyl chloride (PVC), polyethylene (PE), polypropylene (PP), nylon (Ny), and epoxy. Examples of the material for the gate electrode 2, gate line G, capacitor electrode 10, and capacitor line C may include metals such as Al, Ag, Cu, Cr, Ni, Mo, Au, and Pt, conductive oxides such as ITO, carbon, and conductive polymers. These components may be formed by printing and baking an ink, or by forming a layer over the insulating substrate 1 and then performing photolithography, etching, and resist stripping. Alternatively, resist-printing, etching, and resist stripping may be performed after formation of the layer, to form the components. Examples of the material for the gate insulating layer 3 may include inorganic materials such as $SiO_2$, SiON, SiN, and organic materials such as polyvinyl phenol (PVP) and epoxy. The gate insulating layer 3 may be formed by vacuum deposition such as sputtering or CVD, or by applying and baking a solution. Examples of the material for the source electrode 4, source line S, drain electrode 5, and pixel electrode 7 may include metals such as Ag, Cu, Cr, Ni, Mo, Au, Pt, and Al, conductive oxides such as ITO, carbon, and conductive polymers. These components are preferably formed by printing and baking an ink, although they may be formed by forming a layer over the insulating substrate 1 and then performing photolithography, etching, and resist stripping. A suitable printing technique is offset printing. Offset printing techniques that may be used include reverse offset printing and gravure offset printing. Examples of the material for the semiconductor pattern 6 may include organic semiconductors such as polythiophene, acene, and allylamine, and oxide semiconductors such as $In_2O_3$, $Ga_2O_3$, ZnO, $SnO_2$, InGaZnO, InGaSnO, and InSnZnO. A suitable method for producing the semiconductor pattern 6 is to print and bake a solution such as by using ink-jet printer, dispenser, or relief printing. As the material for the protective layer 6', a fluororesin, polyvinylalcohol, or the like is suitable. A suitable method for producing the protective layer 6' is to print and bake a solution such as by using ink-jet printer, a dispenser, or relief printing. Examples of the material for the insulating layer 8 may include resins such as epoxy or acrylic, and photoresist. A suitable method for producing the insulating layer 8 is screen printing or gravure offset printing, although photolithography can be used. As the material for the upper pixel electrode 9, Ag paste, C paste, or the like is suitable. The upper pixel electrode 9 may be formed by screen printing or gravure offset printing.

Figure 5:
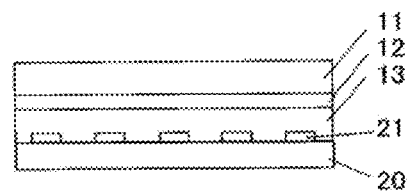
FIG. 5 is a cross-sectional view of an example image display apparatus.

FIG. 5 illustrates an image display apparatus employing the thin-film transistor array 20. The image display apparatus is formed by disposing a display medium 13 between the thin-film transistor array 20 manufactured as illustrated in FIGS. 3A to 3F and FIGS. 4A to 4F, and a counter electrode 12 formed on a separate substrate 11. The display medium 13 displays an image when its display state is changed by electric field produced between a pixel electrode 21 of the thin-film transistor array 20 and the counter electrode 12 on the substrate 11. An upper pixel electrode 9 serves as the pixel electrode 21 when the configuration using the upper pixel electrode 9 is employed, or a pixel electrode 7 in an opening of the insulating layer 8 serves as the pixel electrode 21 when a configuration without the upper pixel electrode 9 is employed.

Examples of the material for the substrate 11 may include organic materials such as polyethylene terephthalate (PET), polyethylene naphthalate (PEN), polyether sulfone (PES), polycarbonate, polyimide (PI), polyether imide (PEI), polystyrene (PS), polyvinyl chloride (PVC), polyethylene (PE), polypropylene (PP), nylon (Ny), and epoxy. As the counter electrode 12, a transparent electrode formed of ITO, IZO, polyaniline, PEDOT:PSS, or the like is suitable. Suitable examples of the display medium 13 include liquid crystals, photochromic mediums, and electrophoretic mediums. As the liquid crystal, polymer dispersed liquid-crystals are suitable. Suitable examples of the electrophoretic mediums include a capsule containing a solution in which charged particles of one color and charged particles of another color are dispersed, or a capsule containing a colored solution in which charged particles of one color are discharged, or a capsule containing charged particles of one color and charged particles of another color together with an air.

EXAMPLES

Example 1

With reference to FIGS. 4A to 4F, Example 1 of the present invention will be described. The thin-film transistor array 20 of FIG. 4E was made through the processes illustrated in FIGS. 4A to 4F. The number of pixels was 1200×100. First, a 50 nm-thick layer of Al was deposited on PEN (insulating substrate 1) by vapor deposition, and gate electrodes 2, gate lines G, capacitor electrodes 10, and capacitor lines C were formed (see FIG. 4A). The gate lines G and capacitor lines C were shifted by one row every fourth column. Then a polyvinyl phenol solution was spin-coated, and baked at 150° C., to form 1 μm-thick polyvinyl phenol as a gate insulating layer 3. An Ag ink was then offset-printed, and baked at 180° C., to form patterns as source electrodes 4, source lines S, drain electrodes 5, and pixel electrodes 7 (see FIG. 4B).

A polythiophene solution was subjected to relief printing, and baked at 100° C., to form a semiconductor layer 6 (see FIG. 4C). Then, fluororesin was screen-printed, and baked at 100° C., to form a protective layer 6' (see FIG. 4D).

Epoxy resin was screen-printed, and baked at 100° C., to form an insulating layer 8 with an opening on each pixel electrode 7, (see FIG. 4E).

ITO was deposited as a counter electrode 12 to PET (separate substrate 11), and a polymer dispersed liquid-crystal was applied as a display medium 13 to the counter electrode 12. The thin-film transistor array 20 was attached to this, to form an image display apparatus (see FIG. 5). Consequently, an image was displayed with a source driver having 400 outputs and a gate driver having 300 outputs. The numbers of the source driver's output and gate driver's output are respectively one third the number of columns (1200 columns) and three times the number of rows (100 rows).

Example 2

With reference to FIGS. 4A to 4F, Example 2 of the present invention will be described. The thin-film transistor array of FIG. 4F was made through the processes of FIGS. 4A to 4F. The number of pixels was 1600×75. First, an Ag ink was offset-printed on PEN (insulating substrate 1), and baked at 180° C., to form patterns as gate electrodes 2, gate lines G, capacitor electrodes 10, and capacitor lines C (see FIG. 4A). The gate lines G and capacitor lines C were repeatedly shifted by one row at fifth column, one row at fifth column, and one row at sixth column, in this order. Then a polyvinyl phenol solution was spin-coated, and baked at 150° C., to form 1 μm-thick polyvinyl phenol as a gate insulating layer 3. An Ag ink was then offset-printed, and baked at 180° C., to form patterns as source electrodes 4, source lines S, drain electrodes 5, and pixel electrodes 7 (see FIG. 4B).

A polythiophene solution was subjected to relief printing, and baked at 100° C., to form a semiconductor layer 6 (see FIG. 4C). Then, fluororesin was screen-printed, and baked at 100° C., to form a protective layer 6' (see FIG. 4D).

Epoxy resin was screen-printed, and baked at 100° C., to form an insulating layer 8 with an opening on each pixel electrode 7, (see FIG. 4E). An Ag paste was screen-printed, and baked at 100° C., to form an upper pixel electrode 9 (see FIG. 4F).

ITO was deposited as a counter electrode 12 to PET (separate substrate 11), and a polymer dispersed liquid-crystal was applied as a display medium 13 to the counter electrode 12. The thin-film transistor array 20 was attached to this, to form an image display apparatus (see FIG. 5). Consequently, an image was displayed with a source driver having 400 outputs and a gate driver having 300 outputs. The numbers of the source driver's output and gate driver's output are respectively one-fourth the number of columns (1600 columns) and four times the number of rows (75 rows).

As described above, the present invention reduces the number of source signals to 1/i, and increases the number of gate signals by i times (i is 2 or more), in a thin-film transistor array. This configuration allows the number of source drivers and gate drivers to be adjusted and used efficiently when, for example, there is a large difference in the number of pixels between the rows and columns. The thin-film transistor array can be easily made by printing, providing an image display apparatus at low cost. The source line and gate line may be interchanged.

An aspect of the present invention is to provide a thin-film transistor array whose number of signals required for source lines or gate lines is reduced to less than half, and an appropriate method for manufacturing the same.

According to one aspect to solve the problem, the present invention provides a thin-film transistor array including an insulating substrate, a plurality of gate lines formed on the insulating substrate, a plurality of source lines formed on the insulating substrate, and a plurality of transistors each disposed corresponding to a respective intersection of the gate lines and source lines and arranged in a matrix on the insulating substrate as pixels. Each of the transistors has a gate electrode connected to each of the gate lines, a source electrode connected to each of the source lines, a drain electrode, and a pixel electrode connected to the drain electrode. Each of the source lines is connected to each column of the pixels, and each of the gate lines has at least a portion connected to a pixel group formed of a row of a predetermined number of pixels and to another pixel group disposed in an adjacent row.

The pixels may be arranged in a pattern with N rows×M columns, a same source signal may be connected to i source lines, and ones of the pixels connected to the same source signal are each connected to a different one of the gate lines so that the number of the source signals is M/i and the number of the gate signals is N×i, where i is an integer greater than or equal to 2.

When the predetermined number is k, k may be 1 or more and M/(i×N) or less.

The pixels may be of equal pitch.

The thin-film transistor may further include a semiconductor pattern disposed between the source electrode and drain electrode, and an insulating layer covering at least the semiconductor pattern, the source electrodes, and the source lines and having an opening on the pixel electrode. The semiconductor pattern may be parallel to the source line so as to have a stripe pattern, and provided for each column of the pixels.

The thin-film transistor may further include an upper pixel electrode connected to the pixel electrode via the opening.

Another aspect of the present invention is a method for manufacturing a thin-film transistor array. The method includes at least steps of forming, on an insulating substrate, a gate electrode, a gate line connected to the gate electrode, a capacitor electrode, and a capacitor line connected to the capacitor electrode; forming a gate insulating layer over the insulating substrate, the gate electrode, the gate line, the capacitor electrode, and the capacitor line; forming, on the gate insulating layer, a source electrode, a source line connected to the source electrode, a drain electrode, and a pixel electrode connected to the drain electrode; forming a semiconductor pattern between the source electrode and the drain electrode; and forming an insulating layer covering at least the semiconductor pattern, the source electrode, and the source line and having an opening on the pixel electrode. The step of forming a gate electrode, a gate line connected to the gate electrode, a capacitor electrode, and a capacitor line connected to the capacitor electrode includes forming the gate line and the capacitor line such that the gate line and the capacitor line each have at least a portion offset by one row every predetermined number of pixels. The step of forming a source electrode, a source line connected to the source electrode, a drain electrode, and a pixel electrode connected to the drain electrode includes printing an electrode ink such that the source line is formed in a column.

The step of forming the semiconductor pattern may include printing a semiconductor ink such that the ink is parallel to the source line so as to have a stripe pattern.

As can be seen from the above description, the present invention has the following effects. The present invention provides a thin-film transistor array whose number of source signals is reduced. The thin-film transistor array can be manufactured easily by printing.

INDUSTRIAL APPLICABILITY

The thin-film transistor array of the present invention is applicable to a variety of display mediums such as liquid crystal, photochromic medium, and electrophoretic medium. In particular, the thin-film transistor array is useful when there is a large difference in the number of pixels between the rows and columns. Additionally, the thin-film transistor array can be easily produced by a printing process.

REFERENCE SIGNS LIST

1 Insulating substrate
2 Gate electrode
G (G1 to G12) Gate line
3 Gate insulating layer
4 Source electrode
S (S1 to S24) Source line
5 Drain electrode
6 Semiconductor layer
6' Protective layer
7 Pixel electrode
8 Insulating layer
9 Upper pixel electrode
10 Capacitor electrode
C Capacitor line
11 Separate substrate
12 Counter electrode
13 Display medium
20 Thin-film transistor array
21 Pixel electrode
30 Pixel
30' Pixel group Obviously, numerous modifications and variations of the present invention are possible in light of the above teachings. It is therefore to be understood that within the scope of the appended claims, the invention may be practiced otherwise than as specifically described herein.

What is claimed is:

1. A thin-film transistor array, comprising:
an insulating substrate;
a plurality of gate lines formed on the insulating substrate;
a plurality of source lines formed on the insulating substrate; and
a plurality of transistors each being formed on the insulating substrate at a position corresponding to a respective intersection of the gate lines and the source lines, and formed in a matrix including pixels in rows and columns, each of the transistors including
  a gate electrode connected to one of the gate lines,
  a source electrode connected to one of the source lines,
  a drain electrode, and
  a pixel electrode connected to the drain electrode,
wherein each of the source lines is connected to source electrodes of a respective column of pixels, and each of the gate lines includes a first portion connected to gate electrodes of a pixel group which is formed of a row of a predetermined number of pixels and a second portion connected to gate electrodes of other pixel groups which are formed and disposed in adjacent rows of a predetermined number of pixels and which are offset in one direction by one row every predetermined number of pixels.

2. The thin-film transistor array of claim 1, wherein the pixels are formed in N rows×M columns, i source lines of the source lines are connected to a same source signal, where i is an integer greater than or equal to 2, each of the pixels connected to the same source signal is connected to a different one of the gate lines, the number of the source signals is M/i, and the number of the gate signals is N×i.

3. The thin-film transistor array of claim 2, wherein the predetermined number is 1 or more and M/(i×N) or less.

4. The thin-film transistor array of claim 2, wherein the pixels are of equal pitch.

5. The thin-film transistor array of claim 3, wherein the pixels are of equal pitch.

6. The thin-film transistor array of claim 1, further comprising:
  a semiconductor pattern formed between the source electrode and the drain electrode; and
  an insulating layer covering at least the semiconductor pattern, the source electrode and the source lines, and having an opening on the pixel electrode,
  wherein the semiconductor pattern is in stripes in parallel to the source line and each connected to a column of pixels.

7. The thin-film transistor array of claim 2, further comprising:
  a semiconductor pattern formed between the source electrode and the drain electrode; and
  an insulating layer covering at least the semiconductor pattern, the source electrode and the source lines, and having an opening on the pixel electrode,
  wherein the semiconductor pattern is in stripes in parallel to the source line and each connected to a column of pixels.

8. The thin-film transistor array of claim 3, further comprising:
  a semiconductor pattern formed between the source electrode and the drain electrode; and
  an insulating layer covering at least the semiconductor pattern, the source electrode and the source lines, and having an opening on the pixel electrode,
  wherein the semiconductor pattern is in stripes in parallel to the source line and each connected to a column of pixels.

9. The thin-film transistor array of claim 4, further comprising:
  a semiconductor pattern formed between the source electrode and the drain electrode; and
  an insulating layer covering at least the semiconductor pattern, the source electrode and the source lines, and having an opening on the pixel electrode,
  wherein the semiconductor pattern is in stripes in parallel to the source line and each connected to a column of pixels.

10. The thin-film transistor array of claim 6, further comprising:
  an upper pixel electrode connected to the pixel electrode via the opening.

11. The thin-film transistor array of claim 7, further comprising:
  an upper pixel electrode connected to the pixel electrode via the opening.

12. The thin-film transistor array of claim 8, further comprising:
  an upper pixel electrode connected to the pixel electrode via the opening.

13. The thin-film transistor array of claim 9, further comprising:
  an upper pixel electrode connected to the pixel electrode via the opening.

* * * * *